(12) United States Patent
Brink et al.

(10) Patent No.: US 7,324,307 B2
(45) Date of Patent: *Jan. 29, 2008

(54) PLATED BASE PLATE FOR SUSPENSION ASSEMBLY IN HARD DISK DRIVE

(75) Inventors: Damon D. Brink, Santa Barbara, CA (US); Ryan Schmidt, Santa Barbara, CA (US); Kevin Hanrahan, Santa Barbara, CA (US); Jack Bish, Santa Barbara, CA (US)

(73) Assignee: Intri-Plex Technologies, Inc., Santa Barbara, CA (US)

( * ) Notice: Subject to any disclaimer, the term of this patent is extended or adjusted under 35 U.S.C. 154(b) by 582 days.

This patent is subject to a terminal disclaimer.

(21) Appl. No.: 10/241,609

(22) Filed: Sep. 10, 2002

(65) Prior Publication Data

US 2003/0156357 A1 Aug. 21, 2003

(51) Int. Cl.
*G11B 5/48* (2006.01)
(52) U.S. Cl. .................................................. 360/244.6
(58) Field of Classification Search ............. 360/244.6, 360/244.5
See application file for complete search history.

(56) References Cited

U.S. PATENT DOCUMENTS

| | | | |
|---|---|---|---|
| 5,344,502 A * | 9/1994 | Mack et al. ................. 148/236 |
| 5,591,277 A * | 1/1997 | Braunheim .................. 148/578 |
| 5,689,389 A | 11/1997 | Braunheim | |
| 5,877,919 A * | 3/1999 | Foisy et al. ............... 360/244.6 |
| 5,896,646 A * | 4/1999 | Boutaghou et al. ....... 29/603.01 |
| 6,183,841 B1 | 2/2001 | Hanrahan | |
| 6,226,152 B1 * | 5/2001 | Tanaka et al. ........... 360/244.6 |
| 6,231,689 B1 | 5/2001 | Fife | |
| 6,231,698 B1 * | 5/2001 | Braunheim et al. ......... 148/606 |
| 6,351,349 B1 | 2/2002 | Braunheim et al. | |
| 6,372,314 B1 * | 4/2002 | Schmidt et al. ............ 428/34.1 |
| 6,754,044 B1 * | 6/2004 | Braunheim et al. ....... 360/244.6 |
| 6,958,890 B1 * | 10/2005 | Lin et al. ................. 360/244.6 |

* cited by examiner

*Primary Examiner*—Brian E. Miller

(57) ABSTRACT

A swage mount that includes a flange, having a first side and a second side, and a cylindrically shaped hub. The hub is primarily comprised of a metal (such as stainless steel), and extends from the second side of the flange, and has an inner surface and an outer surface. The surface of the swage mount is plated with one or more layers of metal, or a combination of metals, which provide a) increased retention torque, and b) increased part cleanliness. This invention may be used in conjunction with surface hardened swage mounts that contain surface protrusions. In this case the metal plating prevents separation of the protrusions from the swage mount, thereby preventing contamination.

8 Claims, 3 Drawing Sheets

PLATED BASE PLATE FOR SUSPENSION ASSEMBLY IN HARD DISK DRIVE

BACKGROUND OF THE INVENTION

1. Field of the Invention

This invention relates to disk head assemblies for supporting read/write heads adjacent rotating disks in disk drives and more particularly, to a swage mount for attaching a head suspension assembly to a head actuator arm.

2. Description of the Prior Art

In hard disk drives data are stored on magnetizable surfaces of a plurality of rotatable disks that are mounted in a coaxial stack on a housing of the drive. Transducer heads that write data to and read data from the disk surfaces are supported by an actuator that is mounted on the housing and can be actuated to position the transducer heads in alignment with concentric data tracks defined on the disks. Each transducer head is attached to one end of a head suspension that is connected to an actuator arm that extends from the actuator body. The suspensions include a flexible load beam constructed of light sheet steel that has a bend formed in it. The load beam acts as a spring that forces the head against the disk surface with an accurate preload or "gram load". Air turbulence caused by the rotating disks lifts the heads slightly off of the disks so that the heads fly on an air bearing across the disk surfaces. The suspension gram load counteracts the air bearing force.

The head suspension is attached to the actuator arm using a base plate (swage mount) that forms a part of the head suspension. The base plate includes a flat flange portion and a cylindrical hub portion or boss. The base plate hub is passed through a load beam clearance hole in the load beam and the flange is spot welded to the load beam. The combined base plate, load beam and a flexure make up a head suspension, and the suspension has the hub of the base plate extending through and beyond the load beam clearance hole.

The hubs of two suspensions are inserted into an actuator arm boss hole formed through an actuator arm extending from an actuator body, one hub entering an actuator arm boss hole from each end of the hole. A swage ball is passed through the cylindrical hubs to force the peripheries of the hubs to expand (swage) into tight engagement with the inner peripheries of the actuator arm boss hole. Thus, an actuator arm may carry two suspensions on opposite sides thereof to support two transducer heads in opposing directions, one up and one down.

The hub is an extended boss whose upper end is contiguous with the flange portion and whose lower end passes through boss clearance holes in both the load beam and the actuator arm. The hub region supplies the retention torque between the base plate, which is welded to the load beam, and the actuator arm by plastically expanding and cold working during the swaging operation, creating a press fit with the actuator arm.

Problems with this method of mounting transducer heads have arisen as the need for increased data storage capacity in hard disk drives has grown and the size of the disk drive has decreased to fit in small lap top computers. The problem of forming a strong connection between the actuator arms and the transducer suspensions has been made more difficult as the size of the components has become smaller. In the prior art, relatively high swaging forces are needed to insure that a base plate makes a strong connection with the actuator arm boss hole. As the part get smaller and thinner, these high forces cause unacceptable large distortions in the load beam and cause preload changes.

One such method for reducing the overall drive size is to reduce the size of the stacked vertical joint connecting the load beam to the actuator assembly. For example, in U.S. Pat. Nos. 6,183,841 and 5,689,389, a low profile swage mount fastener is used to connect a load beam to an actuator arm of an actuator assembly. Because the swage mount fastener has a low profile, the overall height of the disc drive may be reduced. However, a disadvantage of using a low profile swage mount fastener is that as performance demands increase, it provides less torque retention than is required to withstand the force of the load beam.

In U.S. Pat. Nos. 6,183,841 and 5,689,389 the torque retention characteristics of a low profile swage mount fastener were increased by modifying the internal geometry of the swage mount. However, the level of torque retention that can be achieved solely by modifying the swage mount design is limited. Without increased torque retention values, the acceleration rate a load beam can withstand is limited, which imposes an upper limit on the speed at which the read/write head can be positioned. This in turn will limit the overall access time a disc drive can achieve, a key parameter of disc drive performance. Accordingly, there is a need for a low profile swage mount fastener capable of torque retention values that are significantly higher than have been previously achieved.

U.S. Pat. Nos. 6,231,689 and 6,351,349 are directed at overcoming shortcomings of the prior art. Each patent provides a surface hardened swage mount, a method of hardening the metal from which such parts are made, and for connecting a disc drive actuator arm to a load beam, which results in an increased torque retention characteristic of the swage mount.

Currently, the industry is moving toward nickel-plated aluminum actuator arms, because nickel-plated aluminum arms provide much improved overall cleanliness.

As described above, as base plates get smaller to accommodate the geometries of smaller disk drives, reduced retention torque becomes a problem and this has given rise to a need to increase retention torque. The need to increase retention torque is a problem especially with nickel-plated aluminum actuator arms. A base plate is disclosed in copending U.S. patent application Ser. No. 10/037,643 in which the outer surface of the hub includes numerous protrusions that are less than approximately 50 microns in height. The protrusions are primarily composed of a material (such as a carbide or a nitride) which is different from the stainless steel hub. Preferably, the protrusions are substantially harder (such as at least 50 hardness Vickers harder) than the base material of the hub. The purpose of the protrusions is to provide greater torque retention when the base plate is swaged to an actuator arm.

During manufacture, chromium carbide or chromium nitride is precipitated out of a base metal onto the outer surface of the hub resulting in the surface protrusions. The surface protrusions stick out of the hub outer surface and grab into the aluminum actuator arm boss hole when the hub is swaged. These and other methods of creating hardened modules on the outer hub surface can boost retention torque by 60%-100%.

Swage mounts containing carbides provide higher retention torque than nitrided parts, but tend to shed a higher volume of particles from the surface during the swaging process. Due to the present emphasis on cleanliness within the industry, this currently limits the use of nitride, the most effective precipitate.

It is desirable in swage mount manufacture to increase retention torque and yet maintain or improve cleanliness levels, which may or may not be in conjunction with the aforementioned surface protrusions.

Further, it is also desirable to increase torque in both Al and Ni-plated Al actuator arms.

During current manufacturing of base plates, the base plates are subjected to processes that remove burrs, which may include tumbling using porcelain beads. The reason the base plate is deburred is that a burr may flake off and contaminate the drive mechanism. Furthermore, a burr can cause the base plate to stand off and not mate with the load beam properly. Tumbling to deburr the base plate using porcelain beads that are predominately aluminum oxide may result in aluminum oxide particles coming loose and becoming embedded in the surface of the disk. Studies of failed disk drives have shown that aluminum oxide separating from the beads has been found on the disk surface at the site of a head crash. Even if the head does not crash, an aluminum oxide particle embedded on the disk can cause a thermal asperity. As the head passes over the asperity, the head may be damaged by heat from the friction or an inaccurate reading may occur.

Manufacture of the material used to fabricate the base plates, typically stainless steel, often results in the introduction of metal oxides such as alumina and magnesia into the melt. These oxides and other contaminants in the base metal can form inclusions that may potentially be exposed at the surface of the base plate after manufacturing. These inclusions, should they become loose and fall from the base material, can pose a threat to drive operation in the form of a head crash or thermal asperity, as described above.

It is therefore desirable to cover the imbedded particles and material inclusions, to prevent them from coming loose from the swage mounts during service.

SUMMARY OF THE INVENTION

Briefly, the invention is concerned with a base plate comprising a hub and a flange. The hub is plated with metal to improve the cleanliness and retention torque of the swage mounts. When applicable, the metal plate is used to prevent the protrusions from separating from the hub and contaminating an assembled disk drive. The plating deposit may include, but is not limited to, Ni, Cr, Pt, Pd, Rh, Au, and Ag, or combinations or layers thereof.

In accordance with an aspect of the invention, the hub outer surface prior to plating may be provided with surface protrusions that increase torque retention when the hub is swaged. In all base plates, with or without surface protrusions, the microstructure and associated tribological characteristics of the metal plating is such that retention torque is increased.

The invention has the advantage of increasing retention torque and yet maintaining or improving cleanliness levels, which may or may not be in conjunction with the aforementioned surface protrusions. If used with surface protrusions, the metal plating will more firmly secure the precipitates and prevent protrusion separation, thereby improving cleanliness.

The invention has the advantage that when swaging, the hub outer surface is protected from separation of surface protrusions by a nickel plate for those base plates that have surface protrusions.

The invention also has the advantage that the metal plating may increase the corrosion resistance of the base metal of the swage mount.

The invention has the advantage that retention torque is increased when swaged into either aluminum (Al) or nickel (Ni) plated Al actuator arms. This is due to the columnar microstructure of the metal plate, which is rough on a small length scale. Further torque enhancement in Ni-plated arms can be obtained by a second plating of a hard deposit, such as Pt or Rh, over the microstructure produced by the underlying columnar structure of the first plating deposit. This is due to the increased penetration into the Ni-plated arm afforded by the hard metal plate. This is important because Ni plated Al arms give much improved overall cleanliness, but offer lower values of torque than non-plated Al arms.

Another mechanism of torque improvement involves plating a soft deposit onto the surface of the swage mount. In this case, the softer material can deform locally and conform to the microstructural features of the arm into which the base plate is swaged. This allows an increase in the effective surface area of engagement, which tends to increase torque. In addition, the soft deposit allows partial penetration of any asperities on the surface of the arm into the base plate, offering a second mechanism of a torque increase. Depending on the tribological characteristics of the actuator arm itself, it is sometimes advantageous to plate a second material over the soft deposit. When the second deposit is hard yet thin, the plating can still conform to the microstructural features of the arm due to the flow of the underlying soft layer. In this case, however, the hard layer of the second plating can act to penetrate the actuator arm and increase torque.

BRIEF DESCRIPTION OF THE DRAWING FIGURES

The invention will be described in greater detail with reference to the drawings in which.

In these figures, similar numerals refer to similar elements in the drawing. It should be understood that the sizes of the different components in the figures may not be to scale, or in exact proportion, and are shown for visual clarity and for the purpose of explanation.

DETAILED DESCRIPTION OF THE PREFERRED EMBODIMENTS

Figure 1:
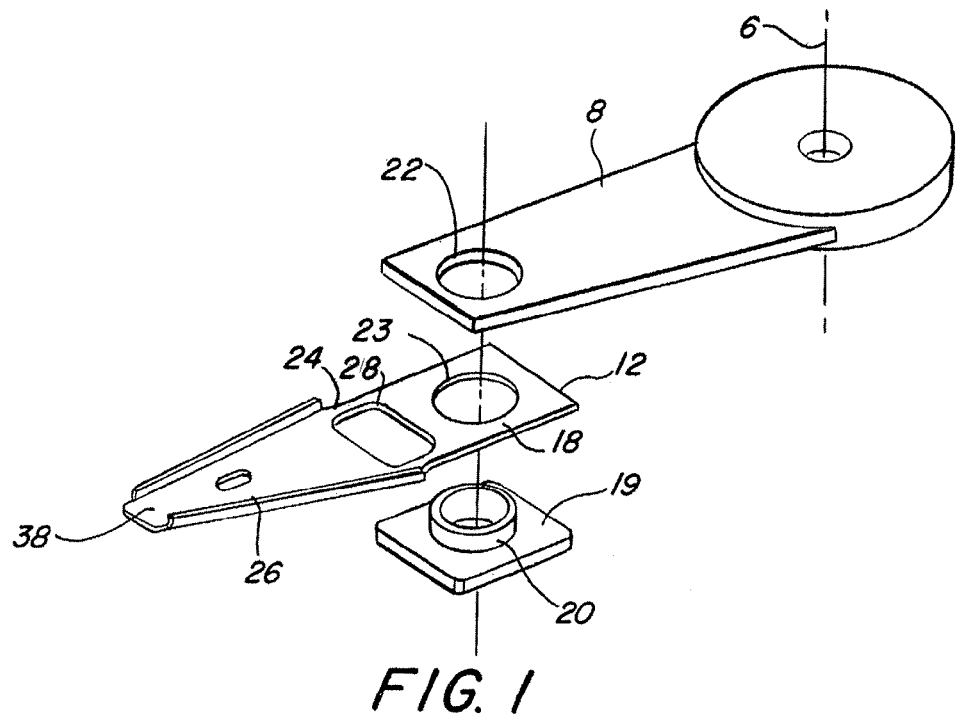
FIG. 1 is an exploded view of a disk drive magnetic head suspension in which the present invention is embodied.

A disk drive has an actuator arm assembly and a stack of spaced-apart disks rotatable about a common shaft. The actuator arm assembly is rotatable about an actuator arm axis. The arm assembly includes a plurality of actuator arms, which extend into the spaces between the disks. One such actuator arm is shown in FIG. 1. Attached to the actuator arm is a magnetic head suspension. The actuator arm 8 when assembled in a stack with a number of identical actuator arms rotates about the actuator arm axis 6.

The magnetic head suspension comprises a resilient load beam 12, a flexure (not shown) and a slider (not shown) on the under side of the load beam 12. The load beam 12 includes a base section 18 having a boss hole 23. The load beam 12 includes a resilient section 24 located between the base section 18 and a protrusion section 26 of the load beam 12. The resilient section 24 is formed to create an angular offset between the base section 18 and protrusion section 26. The degree of bending determines the downward preload force of the slider toward a disk surface. The geometry of the load beam in resilient section 24 and/or the size of an aperture 28 in the resilient section 24 establishes the resilience of the load beam 12. A dimple 38 is formed in the load beam 12, or on the flexure, and is urged against the backside of the slider through a clearance and contributes to a gimbaling action of the slider. A transducer is disposed at the rear edge of the slider.

Figure 2:
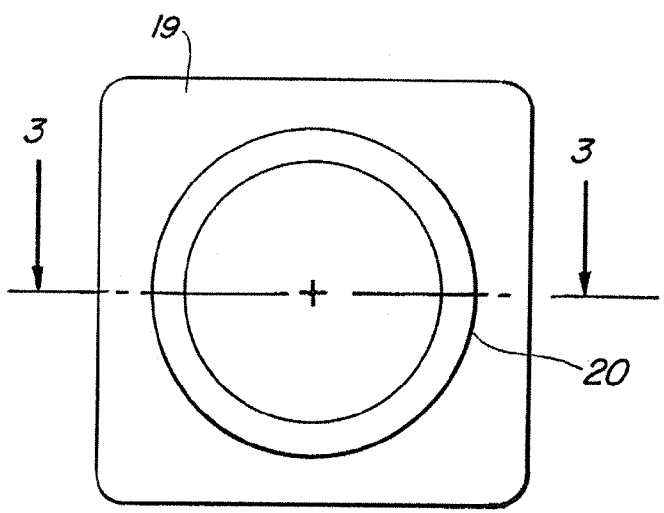
FIG. 2 is a top view of the base plate show in FIG. 1.

The actuator arm and loaded beam element of the actuator arm assembly are connected end to end by the plate (swage mount 21) which includes a flat flange portion 19 and cylindrical hub portion or boss 20. A top view of the base plate is shown in FIG. 2. In assembling the actuator arm, the hub 20 is inserted through a loaded beam boss hole 23 and the flange portion 19 is welded to the load beam 18. The hub 20 is then inserted through a actuator arm boss hole 22. Using a swage machine, a swage ball 33 is driven through the hub 2. The swage ball exerts pressure on the hub 20, which expands (swages) into the boss hole in the actuator arm. The expanded hub rigidly connects the hub 20 and attached load beam 18 to the actuator arm boss hole 22. The expanded hub 20 creates a very tight friction fit against the sides of the boss hole 22. To ensure a tight fit, the length of the hub 20 is such that sufficient contact exists between the outer portion of the hub 20 and the inner portion of the boss hole 22. As the hub plastically deforms, it hardens, which is desirable for maintaining a press fit in the actuator arm boss hole.

The actuator arm 8 is cast out of aluminum and can be nickel-plated, because nickel-plated aluminum arms provide much improved overall cleanliness.

As base plates get smaller to accommodate the geometries of smaller disk drives, reduced retention torque becomes a problem. A base plate is disclosed in the above identified application Ser. No. 10/037643 in which the outer surface of the hub includes numerous protrusions that are less than approximately 50 microns in height. The protrusions are primarily comprised of a material (such as a carbide or a nitride) which is different from the stainless steel hub. Preferably, the protrusions are substantially harder (such as at least 50 hardness Vickers harder) than the base material. The purpose of the protrusions is to provide greater torque retention when the base plate is swaged to an actuator arm.

During manufacture, chromium carbide or chromium nitride may be precipitated out of a base metal onto the outer surface of the hub resulting in the surface protrusions. The surface protrusions stick out of the hub outer surface and grab into the aluminum actuator arm when the hub is swaged. These and other methods of creating hardened modules on the outer hub surface can boost retention torque by 60%-100%.

Prior swage mounts containing carbides provide higher retention torque than nitrided parts, but tend to shed a higher volume of particles from the surface. Due to the present emphasis on cleanliness within the industry, this currently limits the use of the most effective precipitate.

Furthermore, in the prior art, when a swage ball is forced through the inner barrel of the hub 20, the applied swage force and resulting stress tends to cause the protrusions to separate from the hub and contaminate the disk drive assembly.

First Method of Manufacture

In a first embodiment of the present invention a base plate component is manufactured as follows:

(1) A base plate comprising a flange 19 having a first side and a second side, and a hub 20, is formed primarily composed of a base metal such as 300 series stainless steel, the hub extending from the second side of the flange and having an inner surface and an outer surface.

(2) The base plate is heat-treated without forming surface protrusions.

(3) Using a barrel-plating technique, multiple base plates are cleaned using an alkaline surfactant. This entails submerging the parts in a solution of sodium hydroxide or equivalent at a temperature of 150 degrees F to remove gross debris. The parts are then rinsed with deionized (DI) water by rotating the barrel in a rinse station for two minutes.

(4) Remaining in the barrel, the base plates are placed into an 80% sulfuric acid bath at room temperature as a cleaning and activation step. The base plates are then rotated in a barrel, submerged, for between 8 and 10 minutes with an applied potential of 4 volts. The parts are then rinsed to remove residual acids by submerging the barrel, with rotation, in DI water for two minutes.

(5) A nickel strike is then placed on the base plates by placing the barrel in a low concentration Woods bath, consisting of between 10 to 15 oz/gal nickel chloride and 15% hydrochloric acid. The parts are submerged and rotated for 15 minutes and a current density of 1 ASF. The parts are rinsed as previously described.

(6) The base plates are then transferred to a Watts Ni bath that consists of 7-10 oz/gal nickel chloride, 30-40 oz/gal nickel sulfate, and 4-6 oz/gal boric acid. The temperature of the bath is held at a temperature of 135 F. The parts are submerged and rotated for 21 minutes at a current density of 2.5 ASF to achieve a plating thickness between 30 to 40 micro-inches. This combination of operating parameters results in a rough, columnar deposit that has a dull appearance. It is this rough microstructure that forms the basis of the enhanced frictional characteristics achieved by the invention. The parts are then rinsed as described previously.

(7) Following the rinse, the parts are placed in a second Watt's bath that contains, in addition to the above, approximately 50 ppm of saccharrine that acts as a brightener. The parts are submerged and rotated for 10 minutes and a current density of 4 ASF to achieve a brighter surface finish.

(8) The parts are then rinsed, dried and inspected.

Second Method of Manufacture

In a second method of manufacture, steps 1-6 set forth above remain the same. The following manufacturing steps are then performed:

(7) The parts are placed in a rhodium bath that contains 1.3-2 g/L rhodium sulfate and 25-80 ml/L sulfuric acid. The bath is held at a temperature of 130 degrees F. The parts are plated to a thickness of between 3 microns and 9 microns, which offers a hard coating over the rough Watts structure that allows penetration into a Ni plated arm upon swaging and greatly improves retention torque.

(8) The parts are then rinsed, dried and inspected.

Figure 3:
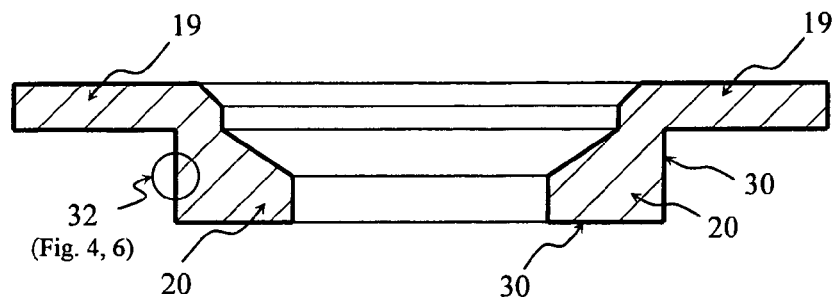
FIG. 3 is a side elevation view of the base plate of FIG. 2 along the view line 3-3.

Refer to FIG. 3, which is a side elevation view of the base plate of FIG. 2 along the view line 3-3. If necessary to meet tolerances, the base plate hub is made smaller than usual for swaging in the actuator arm boss hole 22 and is nickel plated to a thickness that makes up the difference. The nickel plate 30 is illustrated by the bold lines of FIG. 3.

Figure 4:
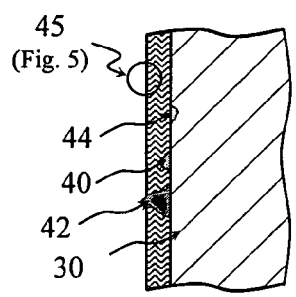
FIG. 4 is an expanded view of a portion of the base plate of FIG. 3.

Refer to FIG. 4, which is an expanded view of a circled portion 32 of the base plate of FIG. 3. The nickel plating 30 is of a thickness that covers the particle 44 embedded in the stainless steel hub 20 and partially covers the hub outer surface protrusions 40, 42.

Figure 5:
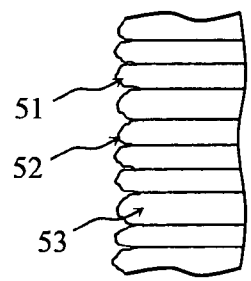
FIG. 5 is a diagram showing surface roughness and columnar structure.

Refer to FIG. 5, which is an expanded view of a circled portion 45 of the Ni plating in FIG. 4. The diagram shows a characteristic surface roughness and columnar structure wherein several column tips 51, 52 are depicted and form the terminus of individual columns 53 in the plating deposit.

Figure 6:
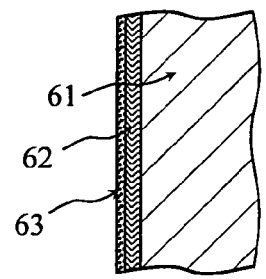
FIG. 6 is a diagram showing multiple layers of plating.

Refer to FIG. 6, which is a diagram showing multiple layers of plating wherein the base metal 61 of the swage mount is covered by a first deposit 62 and a second deposit 63.

Figure 7:
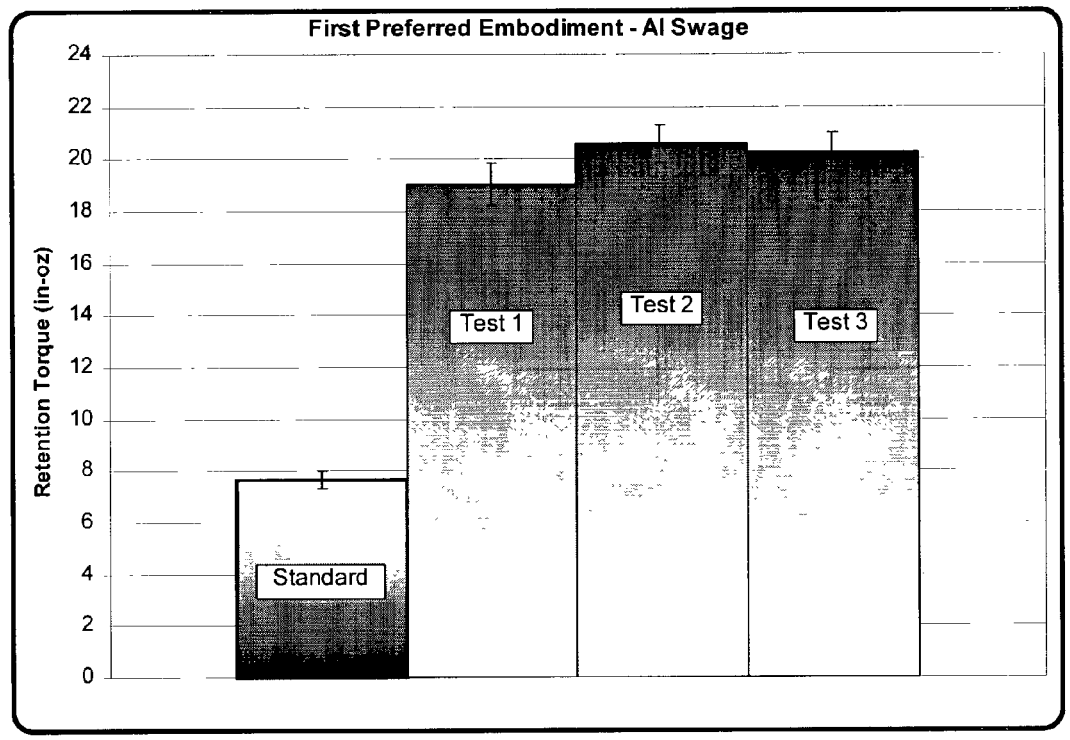
FIG. 7 is a torque performance graph of a base plate manufactured in accordance with the first preferred embodiment of the present invention; and, FIG. 8 is a torque performance graph of a base plate manufactured in accordance with the second preferred embodiment of the present invention.

Refer to FIG. 7, which is a torque performance graph of a base plate manufactured in accordance with the first preferred embodiment of the present invention. The data were gathered using a Universal Swage Tester unit designed and built by Intri-Plex technologies and reflect the retention torque of parts fabricated via the invention compared to the torque of a standard part. In this test, the baseplates are swaged into aluminum coupons and a torque is applied on the baseplate that tends to rotate the baseplate with respect to the aluminum coupon. Using a displacement sensor, the torque at which the baseplates "break away" from the coupon is measured and recorded. The approximately 100% increase in "break away" torque associated with the test is repeated across three separate groups, revealing the consistency of the process.

Figure 8:
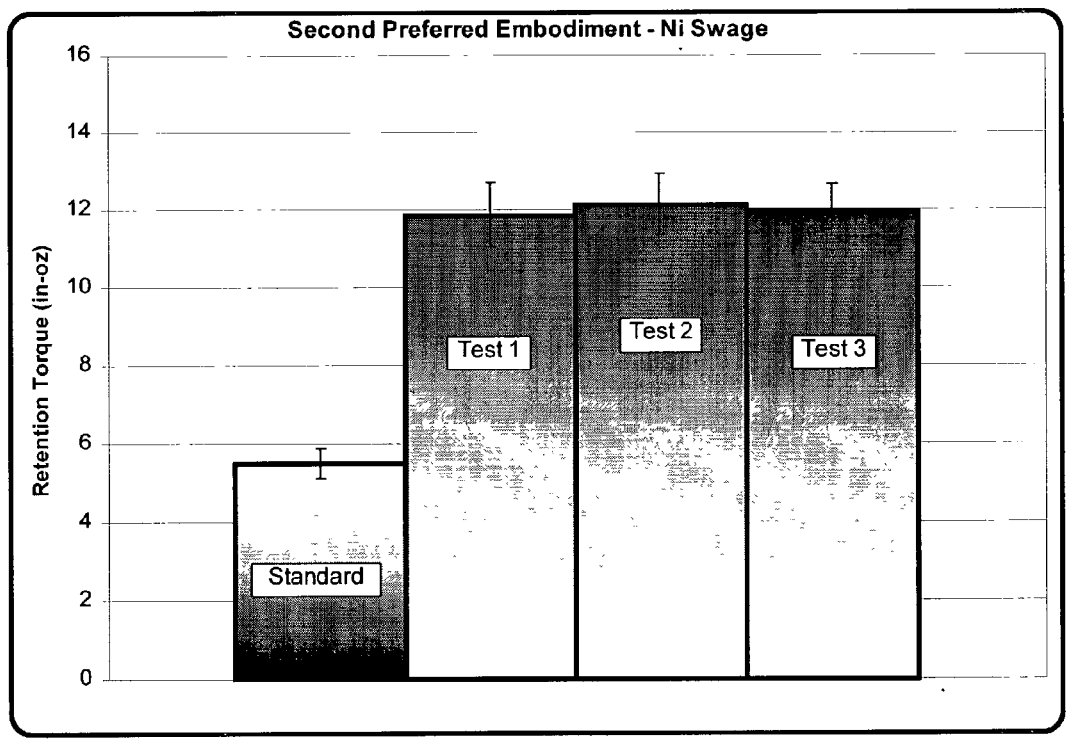

Refer to FIG. 8 which is a torque performance graph of a base plate manufactured in accordance with the second preferred embodiment of the present invention. The data were gathered using a Universal Swage Tester unit designed and built by Intri-Plex technologies and reflect the retention torque of parts fabricated via the invention compared to the torque of a standard part. In this test, the baseplates are swaged into nickel-plated aluminum coupons and a torque is applied on the baseplate that tends to rotate the baseplate with respect to the aluminum coupon. Using a displacement sensor, the torque at which the baseplates "break away" from the coupon is measured and recorded. The approximately 100% increase in "break away" torque associated with the test is repeated across three separate groups, revealing the consistency of the process.

It is understood by a person skilled in the art that any platting method or plating material can be used to achieve the desired objective. For example, the metal plating on the base metal is made of a material that is harder by an amount equal to or exceeding 5 Vickers hardness numbers (VHN). The metal plating can be of sufficient thickness as to secure existing surface protrusions or cover surface particulates of the base metal. Preferably, the metal plating has a surface roughness, Ra, and plate thickness, t, such that $Ra \geq 0.05\ t$. In addition, it is preferable to use a metal plating that increases the corrosion resistance of the base metal.

SUMMARY OF METHOD OF MANUFACTURE

The method of manufacturing a base plate for use in swage mount can be summarized as follows:

A. Forming a flange 19 having a first side and a second side, and a hub 20, primarily composed of a base metal such as 300 series stainless steel, extending from the second side of the flange and having an inner surface and an outer surface.

B. Optionally creating on the outer surface of the hub numerous protrusions 40, 42, that are less than approximately 50 microns in height and that are primarily composed of a material such as a carbide or a nitride which is different from the base metal.

C. Plating the outer surface of the hub with a first metal such as nickel to a thickness that is sufficient to prevent separation of surface oxides and other contaminants and/or protrusions from the hub.

D. Optionally, plating the plated outer surface of the hub with a second metal.

While the invention has been particularly shown and described with reference to preferred embodiments thereof, it will be understood by those skilled in the art that the foregoing and other changes in form and detail may be made therein without departing from the scope of the invention.

What is claimed is:

1. A component for use in swage mounting, comprising: a swage mount having a first side and a second side; and a hub extending from said second side of said swage mount, said hub having an inner surface and an outer surface, said outer surface of said hub comprising a base metal and including a number of particles embedded in said hub and susceptible to being dislodged, said hub being plated with a first metal plating that is different from and harder than the base metal on said outer surface to a thickness that at least partially covers said particles, said plating holding said particles in place, said hub further comprising a second metal plating over the first metal plating, wherein the second metal plating is harder and thinner than the first metal plating.

2. The component of claim 1, wherein said first metal plating has a thickness ranging from 0.5 to 50 microns.

3. The component of claim 1 wherein said first metal plating on said hub has a microstructure with a rough surface.

4. The component of claim 3 wherein said microstructure of said first metal plating is described by a surface roughness, Ra, and plating thickness, t, such that $Ra \geq 0.05\ t$.

5. The component of claim 1 wherein said first metal plating forms columnar microstructures with a rough outer surface.

6. The component of claim 1, wherein said first metal plating is harder than said base metal by an amount equal to or exceeding 5 Vickers hardness numbers.

7. The component of claim 1 wherein the embedded particles are precipitated out of the base metal and at least partially exposed on the outer surface of the base metal.

8. The component of claim 1 wherein the embedded particles are contaminants in the base metal and at least partially exposed on the outer surface of the base metal.

* * * * *